United States Patent
Taylor, Jr. et al.

(10) Patent No.: US 6,855,401 B2
(45) Date of Patent: Feb. 15, 2005

(54) COMPOSITE THERMAL PROTECTIVE SYSTEM AND METHOD

(75) Inventors: Edward W. Taylor, Jr., Ballwin, MO (US); Rubin Feldman, Ladue, MO (US); James A. Rippe, Jr., St. Louis, MO (US)

(73) Assignee: Nu-Chem, Inc., Fenton, MO (US)

( * ) Notice: Subject to any disclaimer, the term of this patent is extended or adjusted under 35 U.S.C. 154(b) by 0 days.

(21) Appl. No.: 10/036,717

(22) Filed: Dec. 21, 2001

(65) Prior Publication Data

US 2002/0119717 A1 Aug. 29, 2002

Related U.S. Application Data

(60) Provisional application No. 60/258,138, filed on Dec. 22, 2000.

(51) Int. Cl.⁷ .................................................. B32B 7/02
(52) U.S. Cl. ........................ 428/212; 252/601; 252/606
(58) Field of Search ........................ 428/212; 252/607, 252/606

(56) References Cited

U.S. PATENT DOCUMENTS

| | | | |
|---|---|---|---|
| 2,680,077 A | | 6/1954 | Nielson et al. |
| 3,284,216 A | | 11/1966 | Kaplan |
| 3,849,178 A | | 11/1974 | Feldman |
| 3,991,011 A | * | 11/1976 | Marciniak et al. .......... 524/111 |
| 4,123,575 A | | 10/1978 | Wesch et al. |
| 4,216,136 A | * | 8/1980 | Stayner ....................... 524/405 |
| 4,265,953 A | * | 5/1981 | Close .......................... 428/78 |
| 4,493,945 A | | 1/1985 | Feldman |
| 4,529,467 A | | 7/1985 | Ward et al. |
| 4,762,746 A | | 8/1988 | Wesch et al. |
| 5,094,887 A | * | 3/1992 | Bagdasarian ................ 427/282 |
| 5,106,901 A | | 4/1992 | Paterson et al. |
| 5,356,568 A | * | 10/1994 | Levine ....................... 252/606 |
| 5,401,793 A | | 3/1995 | Kobayashi et al. |
| 5,433,991 A | | 7/1995 | Boyd, Jr. et al. |
| 5,487,946 A | | 1/1996 | McGinniss et al. |
| 5,580,648 A | | 12/1996 | Castle et al. |
| 5,591,791 A | | 1/1997 | Deogon |
| 5,622,774 A | | 4/1997 | Feldman et al. |
| 5,750,927 A | * | 5/1998 | Baltazar .................... 174/68.3 |
| 5,811,180 A | | 9/1998 | Berdahl |
| 5,989,706 A | | 11/1999 | McGinniss et al. |
| 6,001,437 A | * | 12/1999 | Thorpe et al. ............. 428/34.5 |

* cited by examiner

*Primary Examiner*—Bruce H. Hess
(74) *Attorney, Agent, or Firm*—Polster, Lieder, Woodruff & Lucchesi, L.C.

(57) ABSTRACT

A composite system capable of protecting a substrate from a jet fire including a lower layer of an active fire protective material and an upper layer of a fire protective material. The upper layer forms an open cell matrix when exposed to a jet fire to permit passage of gasses from the lower layer to ambient. The upper layer comprises a fill of refractory material and protects the system during initial exposure to a hyperthermal condition. The upper layer swells on exposure to hyperthermal conditions, but swells less than the lower layer.

40 Claims, No Drawings

COMPOSITE THERMAL PROTECTIVE SYSTEM AND METHOD

CROSS-REFERENCE TO RELATED APPLICATIONS

This application claims the benefit of U.S. Provisional application 60/258,138 filed Dec. 22, 2000.

STATEMENT REGARDING FEDERALLY SPONSORED RESEARCH OR DEVELOPMENT

Not applicable.

BACKGROUND OF THE INVENTION

This invention relates to thermal protective coatings. It is particularly useful as applied to coatings which are applied to substrates to protect the substrate from extremely high intensity, high velocity hyperthermal conditions.

Various compositions are known which provide protection against fire and other thermal extremes. Presently, such compositions generally include a polymeric binder and form a char when exposed to fire or hyperthermal conditions. The char-forming compositions may operate by various modalities. Several char-forming, fire-resistive coatings are described in Deogon, U.S. Pat. No. 5,591,791. Briefly, such coatings include ablative coatings, which swell to less than twice their original thickness when exposed to fire or other thermal extremes, intumescent coatings such as those disclosed in Nielsen et al., U.S. Pat. No. 2,680,077, Kaplan, U.S. Pat. No. 3,284,216, or Ward et al., U.S. Pat. No. 4,529,467, which swell to produce a char more than five times the original thickness of the coating, and subliming char-forming coatings of the type disclosed in Feldman, U.S. Pat. No. 3,849,178, which undergo an endothermic phase change and expand two to five times their original thickness to form a continuous porosity matrix. The intumescent and subliming coatings are denoted "active" thermal protective coatings. The coatings are also sometimes applied to an intermediate structure which is then applied to the substrate as set out in Feldman, U.S. Pat. No. 4,493,945.

The time required for a given temperature rise across a predetermined thickness of the composition, under specified heat flux, environmental, and temperature conditions, is a measure of the composition's effectiveness in providing thermal protection to an underlying substrate.

Eventually, the char is consumed by physical erosion and by chemical processes, such as oxidation by oxygen in the air and by free radicals produced by the coating or otherwise in a fire environment, and protection is substantially reduced. Before the char is totally consumed, degradation of the char layer leaves it crumbled and without the necessary strength to sustain itself, causing it to fail by being blown off or simply falling off (spalling).

Various methods and structures have also been used or proposed for applying these thermal protective coating materials. The most frequent approach is to apply the materials directly to the substrate, without additional structure. For many applications, however, a reinforcing material, such as fiberglass fabric, graphite fabric, or a wire mesh, has been embedded in the coating material to strengthen the material and prevent it from cracking or falling off the substrate under conditions of flame or thermal extreme. Examples of this approach are found in Feldman, U.S. Pat. No. 3,022,190, Billing et al, U.S. Pat. No. 3,913,290, Kaplan, U.S. Pat. No. 3,915,777, and Billing et al, U.S. Pat. No. 4,069,075. Sometimes the materials are first applied to a reinforcing structure such as a flexible tape or flexible wire mesh, and the combined structure is applied to the substrate. Examples of this approach are found in Feldman, U.S. Pat. No. 3,022,190, Pedlow, U.S. Pat. No. 4,018,962, Peterson et al, U.S. Pat. No. 4,064,359, Castle, U.S. Pat. No. 4,276,332, and Fryer et al, U.S. Pat. No. 4,292,358. In these last-mentioned systems, the purpose of the reinforcing structure may be both to strengthen the resulting composite and to permit its application to a substrate without directly spraying, troweling or painting the uncured coating materials onto the substrate. In any of the foregoing methods and structures, multiple layers are frequently applied to the substrate to provide additional protection.

Presently known materials and methods, however, are not as efficient, in terms of length of protection for a given weight of protective material, as desirable. Efficiency is particularly important because in many applications weight or volume is critically limited. Moreover, heavily loading coating materials with fire retardants may seriously impair their physical characteristics and otherwise limit their suitability as coatings, for example by limiting their film-forming characteristics or their water-resisting characteristics.

Under certain extreme fire conditions, all of these known coating systems have required excessive thickness and weight to provide adequate protection. One of the environments in which such extreme fire conditions can occur is in the vicinity of a delivery pipe carrying flammable compressed gas or liquid, typically a hydrocarbon, from one location to another location. A rupture in the pipe or a failure of a valve or joint can result in a high-temperature, high heat flux, high-velocity flame, frequently termed a "jet fire." If the difference in pressure across the rupture or opening is greater than about two-to-one, a choked flow condition is produced at the aperture, and a supersonic flow of gas is produced downstream of the aperture. The heat flux of these high velocity gases is on the order of about 300 to 320 kilowatts per square meter, and the temperature can typically be from 1,000° C. to 1,500° C. There have been standards produced which define a jet fire and delineate test procedures for assessing the effectiveness of protective coating systems. An important standard is identified as OTI 95 634 "Jet Fire Resistance Test Of Passive Fire Protection Materials" (Health and Safety Executive (UK), Offshore Technology Report, 1996). This document is incorporated herein by reference.

When exposed to the temperatures, heat fluxes, and aerodynamic shear forces of a jet fire, presently known coating systems erode and are quickly consumed or spall and fall off. Ablative coatings tend to produce dense chars having good physical and chemical resistance, but in standard jet fire tests they have been found to allow an underlying substrate to reach the critical temperature in a very short time. In the case of active coatings which swell when exposed to thermal extremes, the degradations are usually in the form of fissures which are formed in the char as a result of differential thermal stresses produced by the high thermal gradients and rapid erosion caused by shear forces.

To increase the strength of char layers during exposure to thermal extremes, and to limit spalling and fissures, fabrics have long been incorporated in the coating materials. As set out in Feldman et al., U.S. Pat. No. 5,622,774, fiberglass fabric provides an inexpensive, easy to install, reinforcement in many high temperature applications. Jet fires, however, raise the fabric to temperatures above the softening point of the glass (around 870° C.), and the fiberglass fabric has disintegrated. Other fabrics have therefore been required. Graphite cloth, as taught in the foregoing Feldman et al., U.S. Pat. No. 5,622,774, and in Castle et al., U.S. Pat. No. 5,580,648, Boyd et al., U.S. Pat. No. 5,433,991, and Kobayashi et al., U.S. Pat. No. 5,401,793, is one choice. The graphite cloth may be either substantially pure carbon or a precursor material, as is well-known in the art. Refractory materials, such as quartz (Refrasil) fabric, are also used. Metal mesh is inexpensive and widely used, but it is heavy and difficult to install. Even when reinforced with fabric or mesh, however, known protective systems are not very efficient in protecting against a jet fire and therefore require thick, heavy coatings to provide even limited protection.

The patents mentioned herein are all incorporated herein by reference.

BRIEF SUMMARY OF THE INVENTION

One of the objects of one embodiment of the present invention is to provide a thermal protective system which is more efficient in protecting against jet fires than presently known system.

Other objects will become apparent to those skilled in the art in light of the following description.

In accordance with one aspect of the present invention, generally stated, a composite system capable of protecting a substrate from a jet fire is provided, the system comprising a lower layer of an active fire protective material and an upper layer of an ablative fire protective material, the ablative material forming an open cell matrix when exposed to a jet fire to permit passage of gasses from the lower layer to ambient.

In accordance with another aspect of the present invention, generally stated, a composite system capable of protecting a substrate from a jet fire is provided comprising a lower layer of an active fire protective material which swells when exposed to a fire or other hyperthermal condition and an upper layer of an active fire protective material which swells when exposed to a fire or other hyperthermal condition, the upper layer swelling less than the lower layer, the upper layer comprising a fill of refractory material comprising at least about seven percent of the upper layer by weight.

In accordance with another aspect of the invention, a method for protecting a substrate from hyperthermal conditions is provided comprising a first step of applying a layer of a first active thermal protective composition to the substrate, and thereafter a second step of applying an upper layer of a second active thermal protective composition to the first layer, the second composition comprising a fill of a refractory material comprising at least about seven percent of the second composition by weight. Preferably, both the first composition and the second composition comprise a polymeric binder and a gas former, the second composition comprising less gas former by weight than the first composition.

In some embodiments, a high-temperature mesh or fabric reinforcement is embedded in the composite system. The reinforcement may be of numerous materials. In one embodiment it is graphite. In another it is metal, such as galvanized steel. In others it is fiberglass of various types; a high temperature polymer such as polyimide, polybenzoimidazole, or polyamide such as Kevlar; a ceramic such as silica or zirconia; or a silicone, or a combination of these materials. Other mesh or fabric reinforcements may also be used, and the reinforcement may be free-floating in the composite or pinned to the underlying substrate. In some embodiments, the mesh or fabric is applied to the lower layer either before or after the lower layer has substantially cured. If the lower layer has substantially cured, an adhesive layer, preferably in the form of a thin coat of the uncured upper layer, may be applied to the lower layer, and the mesh or fabric is embedded in the adhesive layer. In other embodiments, the mesh or fabric is embedded in the upper layer. In other embodiments, the mesh or fabric is embedded in the lower layer. In other embodiments, particularly when a mesh is pinned to the substrate and the thickness of the system is low, the mesh may extend through into both layers of the system. In other embodiments, the amount and size of chopped fibers in the upper layer is chosen to substitute for the mesh or fabric. In other embodiments, no mesh or fabric reinforcement is required because of the requirements of the system. In other embodiments, the mesh or fabric is utilized to set the system off from the substrate as in Feldman, U.S. Pat. No. 4,493,945.

In the preferred embodiments of the composite system, the lower layer is applied directly to the substrate and adheres to it. It will of course be understood that a primer is generally first applied to the substrate to aid in adherence, in accordance with generally accepted practice.

In the preferred embodiments, the lower layer is about 1–25 mm thick. In one embodiment, the lower layer is less than 15 mm thick. In another embodiment, the lower layer is about 3 mm to about 10 mm thick.

The lower layer responds to hyperthermal conditions by expanding to at least twice its original thickness. In some embodiments, the lower layer expands about two to about five times its applied thickness. In other embodiments, the lower layer expands from five to one hundred times its original thickness. The lower layer preferably includes about 30% to about 65% polymeric resin and more than 30% blowing agent (gas former). Numerous useable formulations are known in the art, some examples being given in the foregoing patents. Another is given in McGinniss et al., U.S. Pat. No. 5,487,946. Others are commercially available, for example Chartek 7 (Akzo Nobel/International Paint, Ltd.), Albi Clad 800 (Albi Manufacturing division of Stanchem, Inc.), or Thermo-Lag 3000, Thermo-Lag 2000, Thermo-Lag 440, Thermo-Lag 330, or Thermo-Lag 220 (Nu-Chem, Inc.)

In the preferred embodiments, the upper layer is about 1–25 mm thick. In one embodiment, the upper layer is less than 15 mm thick. In another embodiment, the upper layer is about 2 mm to about 6 mm thick. When mesh or fabric reinforcement is used, it is preferred that the upper layer be at least about 2.5 mm thick.

The upper layer composition forms a part of the present invention both in combination with the lower layer and per se. Thus, in accordance with another aspect of the invention, a thermally protective composition is provided having a polymeric binder, from 5% to 30% of a blowing agent which changes from solid to gas at a hyperthermal temperature to which the composition may be subjected, and at least 7% of a refractory filler.

The refractory filler preferably includes particles or fibers, or both. The fillers preferably comprise glass, graphite, or ceramic fibers and particles (granules). The glass may be of various types. The ceramic may include, for example, metal oxides such as silica, alumina, mullite, magnesium oxide, titanium dioxide, and zirconia; metal carbides such as silicon carbide, aluminum carbide, boron carbide, and zirconium carbide; metal nitrides such as silicon nitride, boron nitride, and aluminum nitride; metal silicates such as aluminum silicate, cordierite, zircon, and steatite; and metal borides such as silicon tetraboride, tungsten boride, and zirconium boride. The graphite may be in the form of substantially pure carbon or may be a precursor material which converts to substantially pure carbon under fire conditions. Any fibers should be limited in length to no more than about 7 mm for use in present-day spray applicators, but longer fibers may be used when the upper layer is applied by other methods such as troweling, brushing, rolling, or molding. In one embodiment, the fillers comprise at least about 15% by weight of the composition. In another embodiment they comprise about 20% to 30%, by weight of the composition. In other embodiments they comprise at least 25% by weight of the composition. The inert fillers increase the erosion resistance of the system and greatly increase its effectiveness. The inert fillers are preferably chosen to reradiate heat (as by reflection) from a high temperature fire more effectively than the upper layer would without the fillers.

The upper layer incorporates a small amount of gas forming composition to ensure that an open porosity matrix is formed under fire conditions. In one embodiment, gas formers comprise less than 30% by weight of the composition of the upper layer. In another embodiment, gas formers comprise between about 10% and about 25% by weight of the composition of the upper layer. The composition of the upper layer is formulated to swell far less than the lower layer under fire conditions, preferably on the order of 10% to 100% of its initial thickness. The upper layer suppresses expansion of the lower layer, but it does not prevent expansion of the lower layer.

In presently preferred embodiments, the upper layer is modified to increase its flexibility and elasticity, as with a flexibilizing agent. In the presently most preferred embodiment, the upper layer includes from about 35% to about 65% epoxy resin. The resin is preferably modified to increase its flexibility and elasticity, illustratively with polysulfide. It is preferably cured with an amine. Other resins such as polyamides, polyimides, acrylics, urethanes, polyisocyanurates, and the like may also be useable. The polysulfide and amine curative components of the presently preferred resin give it sufficient flexibility to permit formation of a gas-permeable open porosity matrix on heating and also permit swelling of the lower layer, particularly in areas of highest heating. Only part of the gasses from the lower layer will permeate through the upper layer. The other part will result in a limited expansion of the lower layer. The upper layer is also resistant to high-temperature stresses produced by having a very high temperature on the surface of the layer and a much lower temperature underneath it.

Additives may be added to the upper layer to improve its properties in other ways. For example, boron or zinc may be added either in elemental or combined form. Colorants, emissivity controlling agents, rheology modifying agents, plasticizers, and the like may also be added.

The upper layer also provides advantages to the system when it has not been exposed to excessive heat or fire. It makes the system more resistant to environmental conditions such as water, salt, radiation, and corrosives, and makes it more resistant to physical abrasion. One embodiment of the present invention has been successfully tested under the immersion/freeze/dry cyclic test program delineated in NORSOK M-501 Standard (Rev. 4, Dec. 1999), both with and without a topcoat. Samples from that test (without a scribe) have performed as well as a sample not subjected to the cyclic test program when tested in sixty minute hydrocarbon fire endurance tests (Norwegian Petroleum Directorate Standard NS 3904). These standards are incorporated herein by reference.

Unlike a traditional topcoat, the upper layer of the present invention has a substantial thickness, of at least one millimeter, preferably at least two millimeters, and it is compatible with the composition of the lower layer. In preferred embodiments of the present invention, the upper layer and lower layer include similar resin systems, but differ in the amounts of gas-forming materials and the amounts of refractory fillers in them.

Although not preferred in many applications envisioned for the present invention, the upper layer may be used without the lower layer in some applications, such as protecting pipes which do not require long-duration protection from fire or other hyperthermal conditions.

It has been found that the composites of the present invention provide at least 30% longer protection under standard jet fire testing procedures than would be provided by a system including only the composition of the upper layer or of the lower layer, even when applied to the full thickness of the composite system. Preferred systems of the present invention provide at least 50% longer protection, and sometimes in excess of 100% longer protection.

The system of the present invention may be utilized to protect a wide variety of substrates. It is particularly useful in protecting structural steel in hydrocarbon recovery or processing facilities, such as deep sea drilling platforms and petroleum processing plants. It also may be used to protect other substrates, including, by way of example, other metals, plastics, piping, flanges, fins, bulkheads, tanks, rocket launch gantries, and the leading edges of hypersonic aircraft.

Other aspects of the present invention will be best be understood in light of the following description.

BRIEF DESCRIPTION OF THE SEVERAL VIEWS OF THE DRAWINGS

Not applicable.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

EXAMPLE 1

A composition for use as an ablative upper layer was prepared containing 35% to 65% by weight of a flexible polymeric resin (illustratively a modified epoxy resin, particularly an epoxy polysulfide resin), 5% to 30% gas formers (illustratively polyol spumifics, amine blowing agents, and phosphate acid producers), and about 10% to about 40% refractory fillers. The illustrative composition is a two-component modified epoxy having a nominal formula as follows:

TABLE 1

|  | Weight percent |
| --- | --- |
| Melamine | 5 |
| Ammonium polyphosphate | 10 |
| Pentaerythritol | 5 |
| Epoxy resin (Bis Phenol A) | 25 |
| Polysulfide and amine curative | 25 |
| Glass fibers (chopped) | 5 |
| Ceramic particles | 25 |

EXAMPLE 2

A lower layer active thermal protective composition was prepared containing 30% to 70% by weight of a polymeric resin (illustratively a modified epoxy resin, particularly an epoxy polysulfide resin) and 20% to 50% gas formers (illustratively polyol spumifics, amine blowing agents, and phosphate acid producers). The composition for use in the following tests was a two-component epoxy-based thermally activated coating, which when exposed to flame or thermal extreme, volatilizes at fixed temperatures, exhibiting a small volume increase (greater than twice the original thickness) through the formation of an open cell matrix, and absorbs and blocks heat to protect the substrate material. The composition included a polyfunctional alcohol, a 1,3,5-triazine-2,4,6-triamine, an epoxy resin and a polymer of bis-(ethylene oxy)methane containing disulfide linkages and curable terminal thiol groups (a polysulfide).

The exemplary composition is a two-component modified epoxy having a nominal formula as follows:

TABLE 2

|  | Weight percent |
| --- | --- |
| Melamine | 5 |
| Ammonium polyphosphate | 25 |
| Pentaerythritol | 10 |
| Epoxy resin | 30 |
| Polysulfide | 20 |
| Glass fibers | 5 |
| Catalyst | 5 |

A test fixture generally as set out in OTI 95634 dated 1996 was sprayed to a thickness of 3 mm with the lower layer composition.

A graphite fabric was pressed into the lower layer before it set. The lower layer was allowed to cure for 17 hours, and 3 mm of the upper layer composition of EXAMPLE 1 was sprayed over the lower layer. The composite was allowed to cure at 30° C. for one month.

EXAMPLE 3

The test article prepared in accordance with EXAMPLE 2 was exposed to a jet fire in accordance with the procedure set out in OTI 95634 dated 1996. The test showed that the composite structure provided approximately sixty minutes of protection under the conditions of the test.

Smaller scale tests indicate that the composite system provides far greater protection than the protection given by a thickness of either the upper layer or the lower layer alone equal to the total thickness of the composite. The results of those tests are summarized below:

TABLE 3

Small scale jet fire simulations

| Temperature | circa 1100° C. | |
| --- | --- | --- |
| Heat Flux | circa 300 kilowatts/m2 | |
| Coating Composition: | A = lower coating, B = upper coating | |
| Test Article | Coating Composition | Time to 400° C. |
| Flat Plate | | |
| 6" × 6" × ¼" | 3 mm of A and 3 mm of B | 44 minutes |
| 6" × 6" × ¼" | 6 mm of A | 27 minutes |
| Pipe | | |
| Diameter-4" | 5 mm of B | 10 minutes |
| Diameter-4" (Wall Thickness: ⅜") | 3 mm of A, 3 mm of B | 26 minutes |

EXAMPLE 4

A full-scale test of a composite system in accordance with the present invention was made in accordance with Offshore Technology Report OTI 95 634. Upper layer and lower layer compositions were formed as shown in Example 1 (Table 1) and Example 2 (Table 2). The test specimen was primed with an epoxy primer and coated with a nominal thickness of 3 mm of the lower layer composition and a nominal thickness of 3 mm of the upper layer composition reinforced with a sized woven carbon fiber fabric with approximately 2.3 openings per square centimeter. The fabric weighed about 105 grams per square meter, and the joint layers of the cloth were overlapped. The overall thickness of the composite system was 6 mm with individual measurements ranging between 5 mm and 7 mm.

At the end of thirty minutes, average box temperature had risen 250° C. above ambient and average web temperature had risen 239° C. After seventy-five minutes, average box temperature had risen 327° C. above ambient and average web temperature had risen 382° C. Maximum rises at thirty minutes were 428° C. and 265° C. respectively; at seventy-five minutes they were 450° C. and 411° C.

A test was also made in accordance with Offshore Technology Report OTI 95 634 on a system comprising the upper layer composition (Example 1, Table 1) alone. The test specimen was primed with an epoxy primer and coated with a nominal thickness of 12 mm of the upper layer composition on the back of the box and 16 mm on the web. The entire structure was reinforced with a sized woven carbon fiber fabric about 8 mm from the box and web surface. An additional layer of fabric was used over the web only at a nominal 12 mm from the web surface. The fabric had approximately 2.3 openings per square centimeter, weighed about 105 grams per square meter, and the joint layers of the cloth were overlapped. The average measured thickness of the system was 12.7 mm (10.5–16 mm) on the back of the box and 15.2 mm (13–17 mm) over the web of the test specimen.

At the end of thirty minutes, average box temperature had risen 121° C. above ambient and average web temperature had risen 175° C. After seventy minutes, average box temperature had risen 180° C. above ambient and average web temperature had risen 347° C. After one hundred twenty minutes, average box temperature had risen 207° C. above ambient and average web temperature had risen 474° C. Maximum rises at thirty minutes were 140° C. and 225° C. respectively; at seventy minutes they were 210° C. and 462° C.; and at one hundred twenty minutes they were 239° C. and 628° C. After one hundred twenty minutes, all the fabric was intact, and no metal substrate had been exposed by the jet fire.

A test was also made in accordance with Offshore Technology Report OTI 95 634 on two systems comprising the lower layer composition (Example 2, Table 2) alone. The test specimen was primed with an epoxy primer and coated with a nominal thickness of 5 mm of the lower layer composition (test A) and 11 mm of the lower layer composition (test B). In each test, the entire structure was reinforced with a 19-gauge wire mesh with 12.7×12.7 mm openings pinned to the substrate. The average measured thickness of the system for test A was 4 mm (2.5–5 mm) on the back of the box and 4.7 mm (3–7 mm) over the web of the test specimen. The average measured thickness of the system for test B was 11 mm (9–14 mm) on the back of the box and 11.4 mm (9–13 mm) over the web of the test specimen.

At the end of thirty minutes, average box temperature of test A had risen 352° C. above ambient and average web temperature had risen 473° C.

At the end of thirty minutes, average box temperature of test B had risen 200° C. above ambient and average web temperature had risen 180° C. After seventy-four minutes, average box temperature had risen 318° C. above ambient and average web temperature had risen 325° C. Maximum rises at seventy-four minutes were 604° C. and 376° C. Metal mesh and metal substrate had been exposed by the jet fire.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A composite system comprising a substrate, a lower layer of a polymeric coating of active fire protective material applied above the substrate, and an upper layer of a polymeric coating of ablative fire protective material applied to the lower layer, the ablative material forming an open cell matrix when exposed to fire or other hyperthermal conditions to permit passage of gasses from the lower layer to ambient, the system protecting the substrate from the hyperthermal conditions.

2. The system of claim 1 wherein the upper layer comprises at least about 7% by weight refractory fillers.

3. The system of claim 1 wherein the upper layer comprises at least 15% by weight refractory fillers.

4. The system of claim 1 wherein the upper layer comprises at least 20% by weight refractory fillers.

5. The system of claim 2 wherein the refractory fillers are selected from the group consisting of glass, graphite, and ceramic.

6. The system of claim 2 wherein the refractory fillers increase reradiation of heat by the upper layer.

7. The system of claim 1 wherein the system is capable of protecting against jet fires for a period of time at least 30% greater than is provided by a coating of the same thickness of either the upper layer or the lower layer.

8. The system of claim 1 further comprising a mesh or fabric reinforcement embedded in the system.

9. The system of claim 1 wherein the lower layer has a thickness of about 1 to about 25 mm.

10. The system of claim 1 wherein the lower layer has a thickness of about 2 to about 15 mm.

11. The system of claim 10 wherein the upper layer has a thickness of about 2 to about 6 mm.

12. The system of claim 1 wherein the upper layer has a thickness of about 1 to about 25 mm.

13. The system of claim 1 wherein the upper layer has a thickness of about 1 to about 6 mm.

14. A composite system capable of protecting a substrate from a jet fire, the system comprising a lower layer of an active fire protective material which swells when exposed to a fire or other hyperthermal condition and an upper layer of a fire protective material which when exposed to a fire or other hyperthermal condition swells to form an open cell matrix to permit passage of gasses from the lower layer to ambient, the upper layer swelling less than the lower layer, the upper layer comprising a fill of refractory material comprising at least about seven percent of the upper layer by weight.

15. The system of claim 14 wherein the upper layer comprises at least 15% by weight refractory material.

16. The system of claim 15 wherein the refractory material is selected from the group consisting of glass, graphite, and ceramic.

17. The system of claim 14 wherein the system is capable of protecting against jet fires for a period of time at least 30% greater than is provided by a coating of the same thickness of either the upper layer or the lower layer.

18. The system of claim 14 further comprising a mesh or fabric reinforcement embedded in the system.

19. The system of claim 14 wherein the lower layer has a thickness of about 1 to about 25 mm.

20. The system of claim 14 wherein the lower layer has a thickness of about 2 to about 6 mm.

21. The system of claim 20 wherein the upper layer has a thickness of about 2 to about 6 mm.

22. The system of claim 14 wherein the upper layer has a thickness of about 1 to about 25 mm.

23. The system of claim 1 wherein the upper layer has a thickness of about 1 to about 6 mm.

24. The system of claim 1 wherein the system consists essentially of the substrate, the lower layer and the upper layer, the system being free of mesh or fabric reinforcement embedded in the upper layer or lower layer.

25. The system of claim 24 further comprising a primer layer applied to the substrate.

26. The system of claim 24 further comprising a topcoat.

27. The system of claim 1 wherein the upper layer comprises from 10% to 25% of a blowing agent which changes from solid to gas at a hyperthermal temperature to which the composition may be subjected, and at least 7% of a refractory filler.

28. The system of claim 1 wherein the ablative material swells by about 10% to 100% of its initial thickness when exposed to hyperthermal conditions.

29. The system of claim 8 wherein the reinforcement comprises a graphite fabric.

30. The system of claim 8 wherein the reinforcement comprises a metal mesh.

31. The system of claim 1 wherein the active fire-protective material swells when exposed to hyperthermal conditions to form a char having a thickness two to five times the thickness of the layer as applied.

32. The system of claim 31 wherein the ablative material swells by about 10% to 100% of its initial thickness when exposed to hyperthermal conditions.

33. The system of claim 31 wherein the ablative material comprises a fill of at least 25% by weight of refractory material.

34. A composite system capable of protecting a substrate from a jet fire, the system comprising a lower layer of an active fire protective material which swells when exposed to a fire or other hyperthermal condition, the lower layer comprising 30% to 70% by weight of a polymeric resin and 20% to 50% gas formers, the lower layer having a thickness of about 1 to about 15 mm, and an upper layer of a fire protective material which when exposed to a fire or other hyperthermal condition swells to form an open cell matrix to permit passage of gasses from the lower layer to ambient, the upper layer comprising 35% to 65% by weight of a polymeric resin, 5% to 30% gas formers, and about 10% to about 40% refractory fillers, the upper layer having a thickness of about 1 to about 6 mm, the upper layer containing, on a weight percent basis, less gas formers and more refractory fillers than the lower layer.

35. The system of claim 34 wherein the upper layer and the lower layer comprise the same resin.

36. The system of claim 34 wherein the upper layer and the lower layer comprise an epoxy resin.

37. The system of claim 36 wherein at least the epoxy resin of the upper layer comprises a flexibilizing agent.

38. The system of claim 37 wherein the flexibilizing agent comprises a polysulfide.

39. The system of claim 34 further comprising a mesh or fabric reinforcement embedded in the system.

40. The system of claim 1 wherein the upper layer has a thickness of about 2 to about 6 mm and the lower layer has a thickness of about 2 to about 15 mm.

* * * * *